United States Patent [19]

Johnson et al.

[11] 4,076,329
[45] Feb. 28, 1978

[54] BRAKE MODULATION VALVE FOR PEDAL-APPLIED BRAKES

[75] Inventors: David G. Johnson, Peoria; James P. Mueller, East Peoria, both of Ill.

[73] Assignee: Caterpillar Tractor Co., Peoria, Ill.

[21] Appl. No.: 758,540

[22] Filed: Jan. 12, 1977

[51] Int. Cl.² .............................................. B60T 15/04
[52] U.S. Cl. ......................................... 303/56; 303/50
[58] Field of Search ............... 188/170; 251/227, 236, 251/243; 267/182; 303/50, 54, 56

[56] References Cited

U.S. PATENT DOCUMENTS 1,614,653  1/1927  Christensen ...................... 303/54 X Primary Examiner—Duane A. Reger
Attorney, Agent, or Firm—Phillips, Moore, Weissenberger, Lempio & Majestic

[57] ABSTRACT

A brake modulation valve includes a spool reciprocable in a body to provide application and release of the brakes of a vehicle through movement of a pedal, the movement of the pedal providing application of the brakes being resisted by resilient means in the form of primary, secondary and tertiary springs brought into play in series fashion so that the operator of the pedal is aware of varying pedal feel during application of the brakes.

11 Claims, 4 Drawing Figures

BRAKE MODULATION VALVE FOR PEDAL-APPLIED BRAKES

BACKGROUND OF THE INVENTION

This invention relates to brake actuating mechanism, and more particularly, to a brake actuating mechanism, including a valve in turn including a movable spool for directing fluid pressure to an releasing fluid pressure from the brakes of a vehicle.

In the application of the brakes of a vehicle, wherein the brakes are, for example, applied upon release of fluid pressure therefrom, and released upon application of fluid pressure thereto, it is to be understood that the release of fluid pressure therefrom, generally undertaken through the pivoting of a brake pedal, must be controlled in a careful and accurate manner. This is so because it is important that the operator be aware of and in full control of the extent of braking of the vehicle, so that he can predict with accuracy the effect of a further movement of the pedal in a brake-actuating and a brake-releasing direction. It will also be understood that the structure capable of achieving such accuracy and control of operation must be simple in design and manufacture.

SUMMARY OF THE INVENTION

It is accordingly an object of this invention to provide brake apparatus including lever means in the form of a brake pedal actuatable by an operator of a vehicle to provide brake actuation and release, wherein actuating movement of the pedal is resisted by spring means in such a manner that the operator is aware of the extent of actuation and control of the brakes.

It is a further object of this invention to provide apparatus which, while fulfilling the above object, is extremely simple in design and effective in use.

Broadly stated, the invention is a brake control mechanism including a spool movable in the bore of a body to a first position wherein the brake of a vehicle is released, and to a second position wherein the brake of a vehicle is applied. The invention comprises first resilient means operatively associated with the spool and body for urging the spool toward the second position. Further included are lever means pivotally mounted relative to the body. Second resilient means are operatively associated with the spool and lever means for urging the spool against the resilience of the first resilient means, the second resilient means urging the lever means in a first pivotal direction. Further included are third resilient means operatively associated with the body and lever means for biasing the lever means in a second pivotal direction, the lever means being pivotable in the first pivotal direction against the bias of the third resilient means allowing the second resilient means to extend, in turn allowing the first resilient means to extend to move the spool from its first toward its second position. The third resilient means comprise a primary resilient spring operatively associated with the body and lever means for initially resisting pivoting of the lever means in the first direction at a given spring rate, and a secondary spring operatively associated with the lever means and body to combine with the primary spring upon a certain degree of pivoting of the lever means in the first direction, to resist further pivoting of the lever means in the first direction and a second, higher spring rate than that providing by the primary spring.

BRIEF DESCRIPTION OF THE DRAWINGS

These and other objects of the invention will become apparent from a study of the following specification and drawings, in which.

DESCRIPTION OF THE PREFERRED EMBODIMENT

Figure 1:
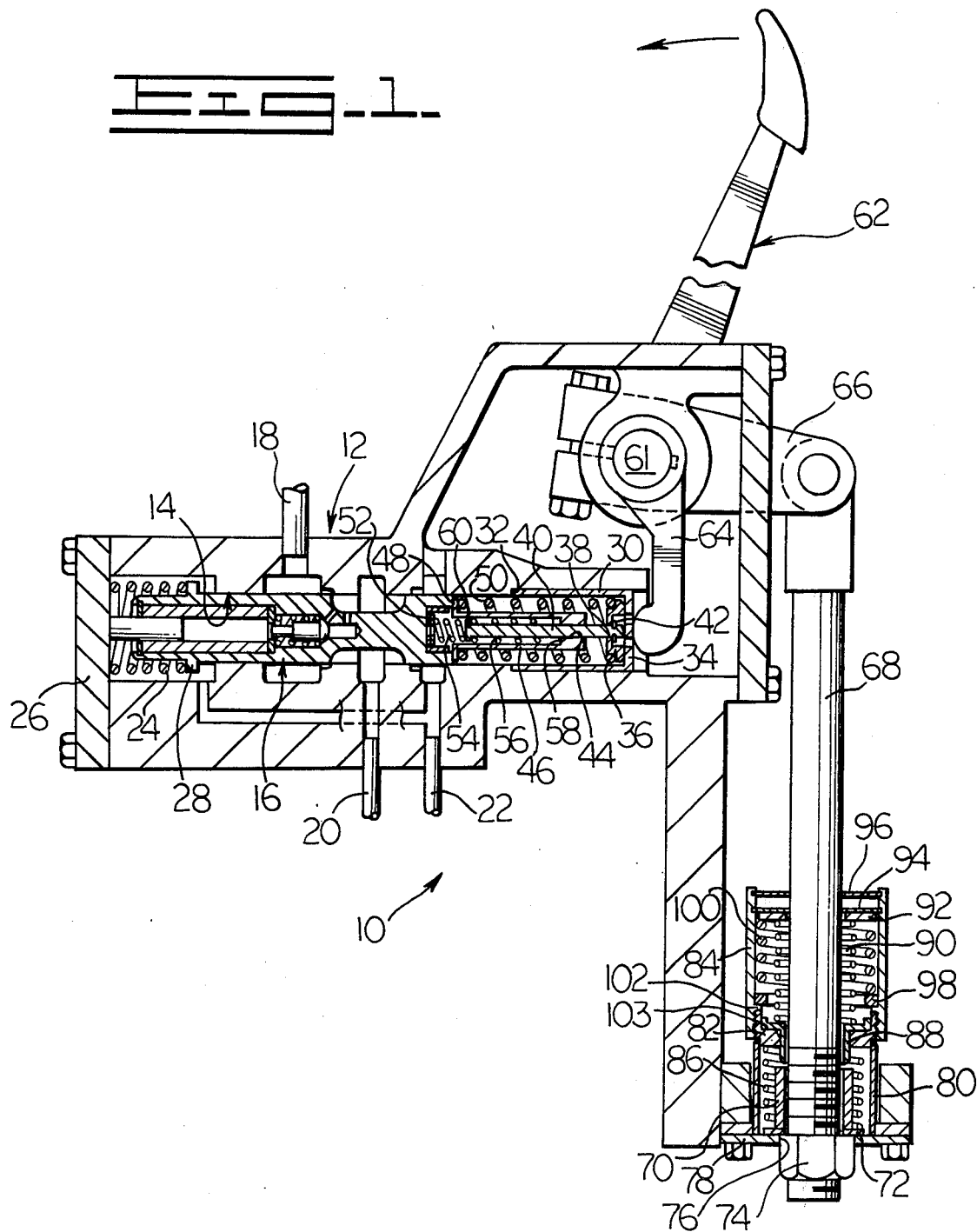
FIG. 1 is a sectional side elevation of the subject apparatus, in a state wherein the brakes of the vehicle are released.

Shown in FIG. 1 is the subject apparatus 10 for controlling the brake actuation of a vehicle, wherein the brakes are applied upon release of fluid pressure thereto, and released upon application of fluid pressure thereto, as is well known. The apparatus 10 includes an overall valve body 12 defining a bore 14 in which a spool 16 is movable. A first conduit 18 communicating with a pressure source (not shown) passes through the body 12 and communicates with the bore 14. A second conduit 20 communicates with the bore 14, and also communicates with the brakes of the vehicle which are, as set forth above, the type wherein application of fluid pressure provides release of the brakes, and release of fluid pressure provide an application of the brakes. Yet another conduit 22 communicates with the bore 14, extending therefrom to tank.

The spool 16 is urged in a rightward direction (FIG. 1), by a resilient helical spring 24 bearing on an end plate 26 of the body and a rib 28 defined by the spool 16.

A cap 30 is reciprocably mounted in the bore, and is limited in movement in a leftward direction by contact thereof with a step 32 in the bore 14. The cap 30 has mounted therein, and bearing against the end wall 34 thereof, a plate member 36. The plate member 36 defines a bore 38 through which is disposed an extending member 40, the plate 36 being retained on the extending member 40 by a snap ring 42. The extending member 40 is in contact with the end 34. The extending member 40 in turn extends through a bore 44 in a sleeve 46, the sleeve 46 defining an annular flange 48 which bears against the end of the spool 16. A helical spring 50 is interposed the plate member 36 and flange 48, the extending member 40 being slidable in the bore 44, so that the spring 50 tends to urge the cap 30 and spool 16 relatively apart.

The spool 16 has fixed in a recess thereof washer means 52, to which in turn is fixed a helical spring 54, the extending end of the spring 54 adjacent the end of the extending member 40 being free, i.e., not attached to the extending member 40.

The extending member 40 has disposed therearound yet another helical spring 56, slidably disposed on the extending member 40, and retained thereon by surface 58 of the sleeve 46 and an annular flange 60 on the end of the extending member 40.

Pivotally mounted to the body 12 on a shaft 61 are lever means 62 in the form of a brake pedal, such pedal 62 having an extending arm 64 which contacts the end wall 34 of the cap 30. A bar 66 is mounted to the pedal 62 to pivot therewith, such bar 66 having pivotally mounted thereto a downwardly extending arm 68. The extending end of the arm 68 has mounted thereon a tubular member 70 which rests on a washer 72, in turn held on the arm 68 by a nut 74. The lower end of the arm 68 passes through an aperture 76 in a plate 78 making up part of the body 14. A first sleeve 80 surrounds a lower portion of the arm 68 and is fixed to the plate 78. The upper portion of the sleeve has fixed thereto a threaded collar 82, and yet another sleeve portion 84 is threadably engaged with the collar 82, about the arm 68. A helical spring 86 is disposed between the washer 72 and collar 82, in a preloaded state. Slidably mounted within the collar 82 is a sleeve member 88, the arm 68 being slidably disposed therethrough. A helical spring 90 is disposed about the arm 68 between the sleeve member 88 and a washer 92 held within the sleeve 84 by a disc 94, the arm 68 movably passing through such disc 94, and also an external disc 96. The spring 90 tends to urge the sleeve 88 into engagement with a stepped portion 103 of the collar 82. A ring 98 is slidably disposed within the sleeve 84, and a helical spring 100 is disposed about the arm 68 between the ring 98 and washer 92, to urge the ring into seating engagement with a stepped portion 102 of the sleeve 84. The springs 90,100 are also each in a preloaded state.

It will be seen that the springs 86,90,100 bias the pedal 62 in a clockwise pivotal direction as shown in FIG. 1, the pedal 62 being pivotable in the opposite direction initially against the bias of the primary spring 86. The springs 50,54 tend to pivot the pedal 62 in such opposite direction. Further pivoting of the pedal 62 in the counterclockwise direction brings the sleeve 70 into contact with the sleeve 88 so that further movement of the pedal 62 in such counterclockwise direction is resisted by both the spring 86 and spring 90. Still further pivoting of the pedal 62 in the counterclockwise direction causes the sleeve 88 to contact the ring 98, so that further counterclockwise pivoting of the pedal 62 is resisted by the primary, secondary and tertiary springs 86,90,100 together.

Generally, during such movement, the arm 64 of the pedal 62 is moved rightwardly within the bore 14, allowing the springs 50,54 to extend, in turn allowing the spring 24 to extend to move the spool 16 from the first position shown in FIG. 1, wherein the brakes of the vehicle are released, to a rightward direction, and eventually to a second position wherein the brakes of the vehicle are applied, as will further be described.

Referring to FIG. 1, it will be seen that with the pedal 62 moved in a clockwise direction to its fullest extent, the cap 30 contacts the step 32. This determines a position of the spool 16 wherein the conduit 18, communicating with the source of fluid pressure, in turn communicates with the conduit 20, applying pressure to the brakes, so that the brakes are released.

Figure 2:
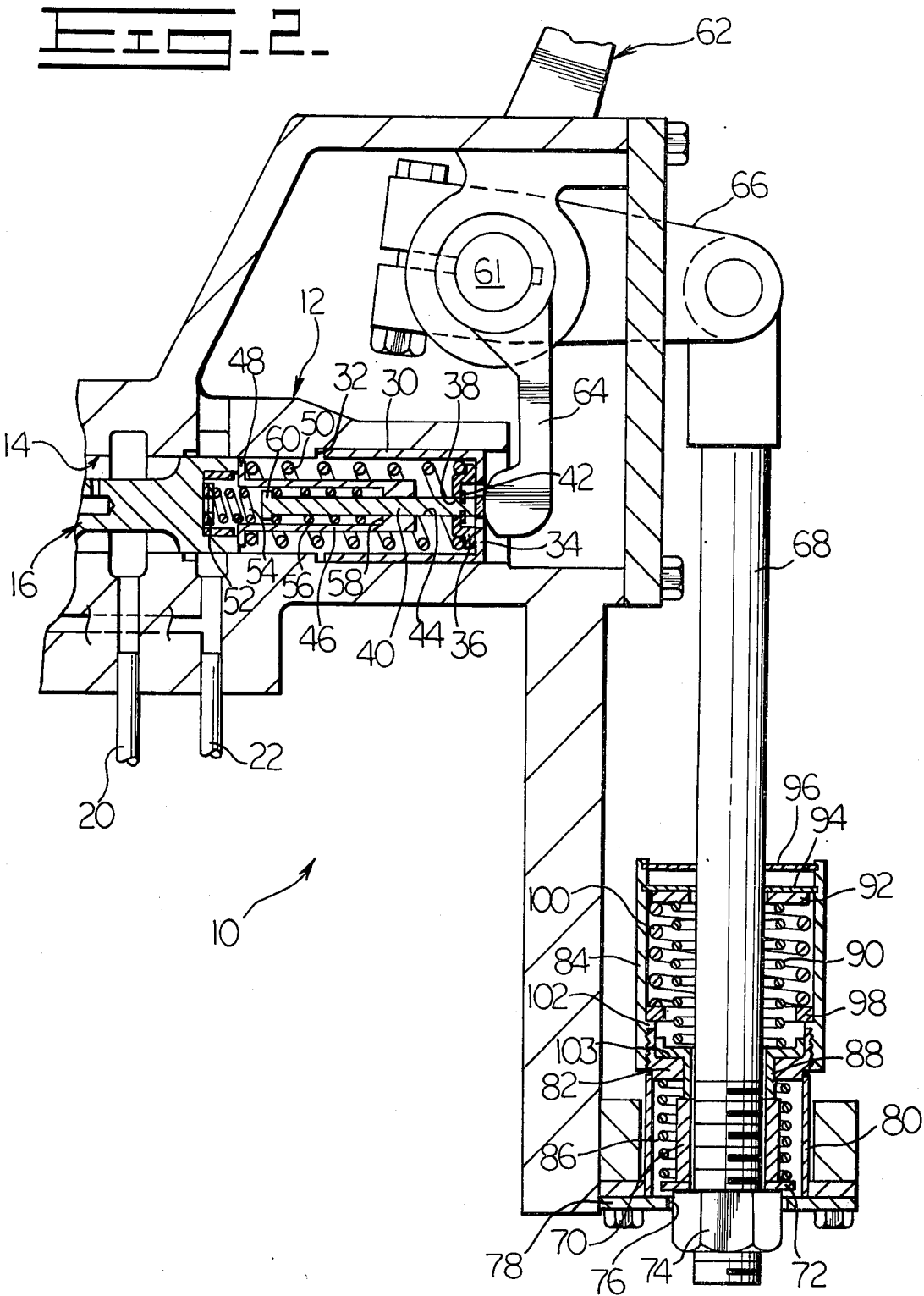
FIG. 2 is an enlarged view of a portion of that apparatus shown in FIG. 1, but with the spool moved to an extent in a brake-applying direction.

Upon initial pivoting of the pedal 62 in the first pivotal direction, such pivotal movement is initially resisted by the primary spring 86, so that the operator is aware of a certain spring force resisting such initial privotal movement. The initial pivotal movement allows the spring 50 and spring 54 to expand, wherein movement of the extended member 40 within the sleeve 46 is allowed, the spring 56 being of such length that it does not fully extend between the flange 60 and the surface 58 with the parts in the state shown in FIG. 1. Such expansion of the springs 50,54 allows the spring 24 to extend, moving the spool 16 rightward to close off conduit 20 from conduit 18. Also, extended member 40 has moved away from the free end of spring 54, such spring 54 being included to insure that the spool 16 is held in a proper position as shown in the FIG. 1 state. That is, during such initial pivoting of the pedal 62 in such first direction, both the springs 54,50 urge the spool 16 against the resilience of the spring 24, but upon a further certain degree of pivoting of the pedal 62 in the first direction, the spring 54 no longer urges the spool 16 against the resilience of the spring 24. The full extension of the spring 54 corresponds to the degree of pivoting of the pedal 62 in the first direction which provides contact of the sleeve 70 with the sleeve 88 as shown in FIG. 2. It will be seen that further pivoting of the pedal 62 in the first direction is resisted by both the spring 86 and spring 90, thus at a second, higher spring rate than that provided by the spring 86. It is also to be remembered that the spring 90 is in a preloaded state, so that a step in force is necessary to provide initial compression of the spring 90, so that the operator of the vehicle would be aware that the second spring 90 is coming into play.

This step in force signal to the operator indicates not only that the spring 54 has been taken out of the system, but also that the spool 16 has been moved rightward almost to a position wherein the conduit 20 communicates with the conduit 22 through bore 14.

Figure 3:
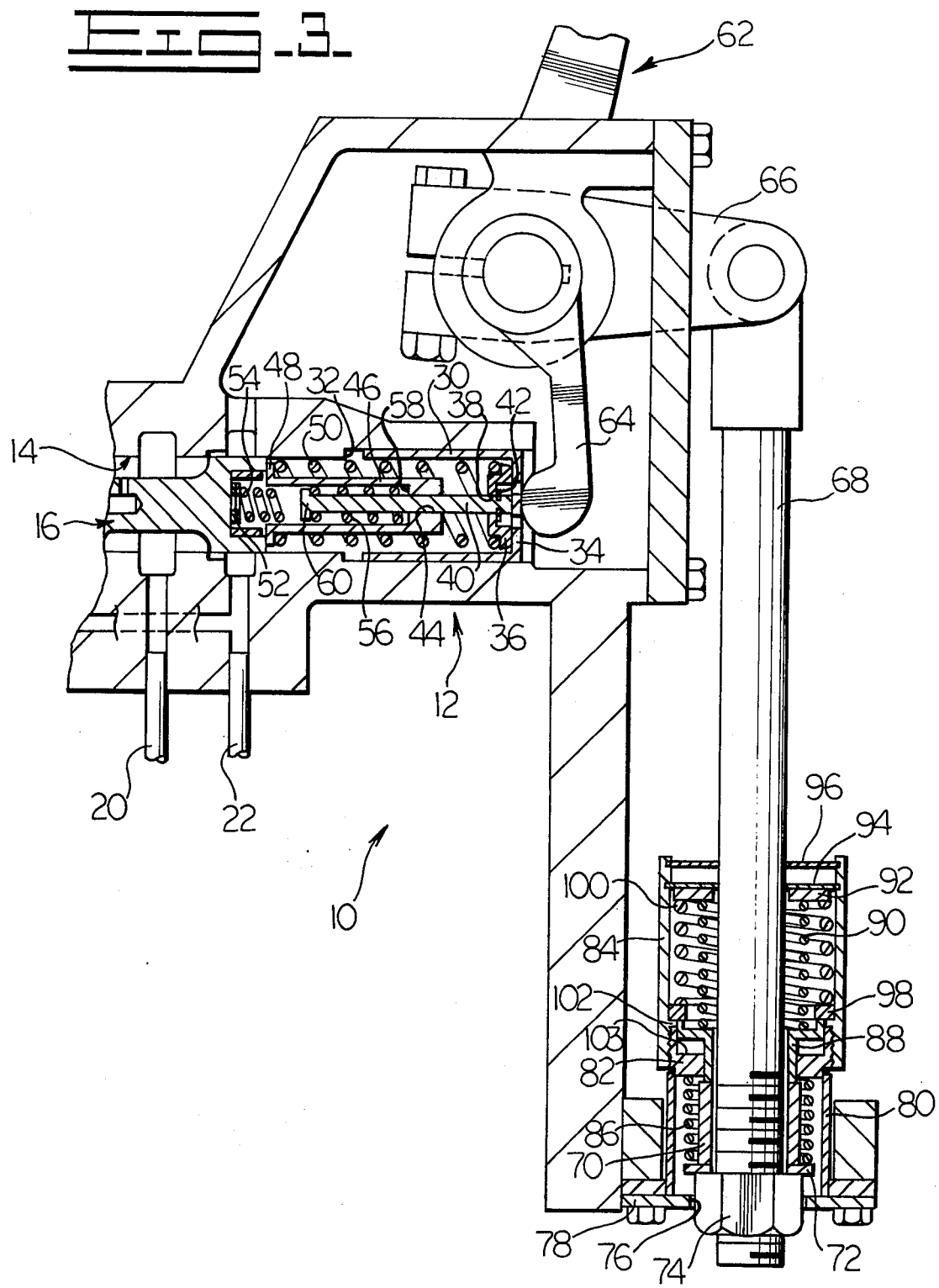
FIG. 3 is a view similar to that shown in FIG. 2, but with the spool moved further in a brake-applying direction.

Further pivoting of the pedal 62 in the first direction provides for further extension of the spring 50, in turn allowing further extension of the spring 24 to move the spool 16 into position wherein actual communication of the conduit 20 and conduit 22 take place, releasing to an extent the pressure applied to the brakes, so that the brakes are partially applied. This further pivoting of the pedal 62 is resisted by both the primary and secondary springs 86,90 as described above. This state is shown in FIG. 3.

Upon even further pivoting of the pedal 62 in the first direction, the sleeve 88 contacts the ring 98, so that all three springs 86,90,100 now resist further pivoting of the pedal 62 in the first direction. It is to be remembered that the spring 100 was in a preloaded state, so that a step in force is necessary to bring the spring 100 into the system. This step in force is indicated to the operator of the vehicle through the pedal 62, and indicates that full brakes of the vehicle would be applied upon further pivoting of the pedal 62 in the first direction.

Figure 4:
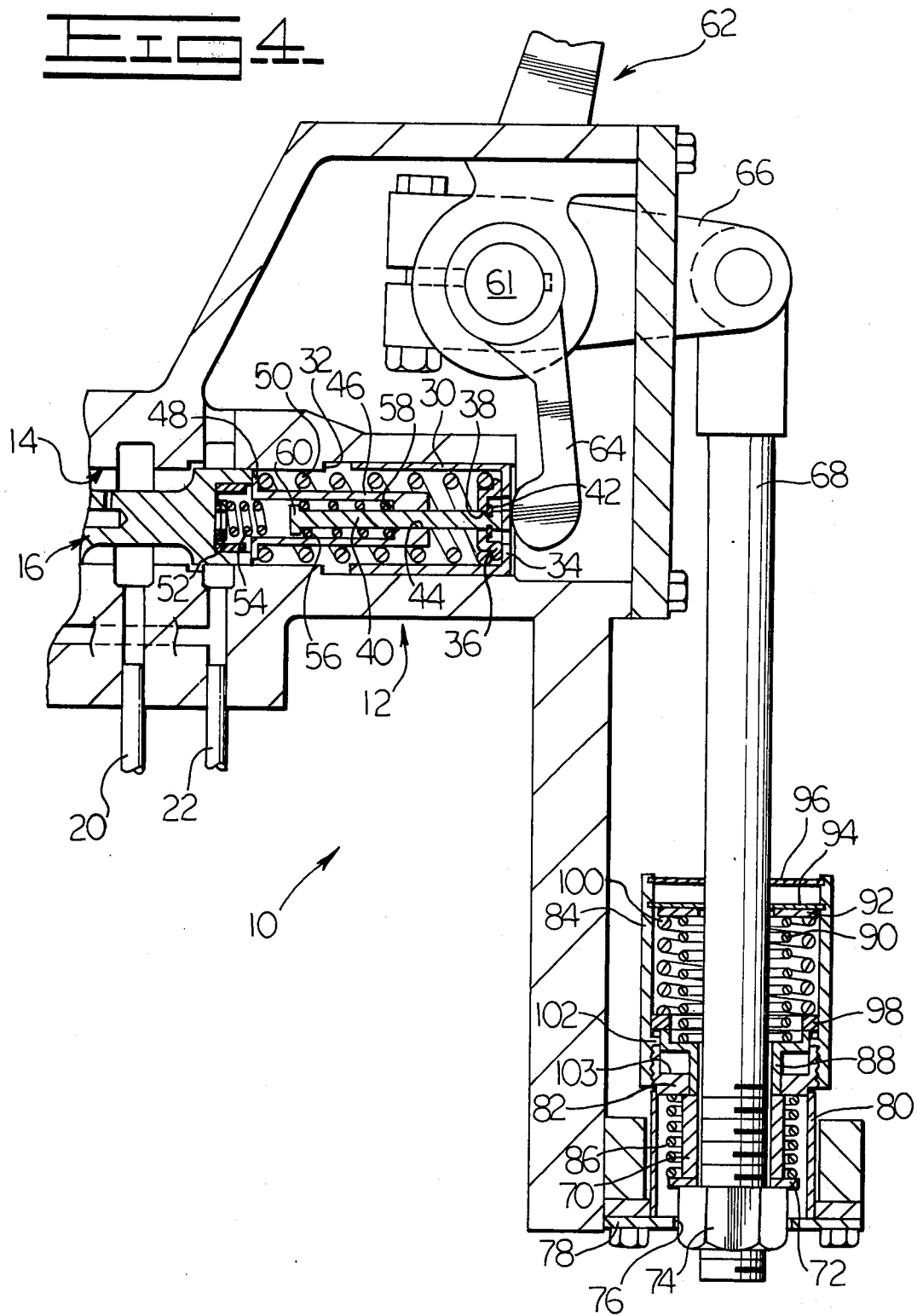
FIG. 4 is a view similar to that shown in FIGS. 2 and 3, but with the spool moved further yet in a brake-applying direction.

The initiation of compression of the spring 100 substantially corresponds to the degree of pivoting of the pedal 62 wherein the ends of the spring 56 are in contact with the surface 58 and flange 60, so that further extension of the spring 50 is resisted to an extent by the smaller spring 56. Further pivoting of the pedal 62 in the first direction provides for more rapid expansion of the spring 24, moving the spool 16 more rapidly in a direction providing full communication between the conduit 20 and conduit 22, providing for full application of the brakes (FIG. 4).

The substantial part of pedal actuation travel takes place during that time wherein both the springs 86,90 are being compressed together, it being remembered that the spring 90 comes into the system at a point just before the brakes are initially applied, with the spring 100 coming into the system just before the point wherein further actuating movement of the pedal 62 provides full actuation of the brakes. The springs 86,90,100 provide a feel to the operator which enables him to know fully the extent of actuation of the brakes, and exactly what the effect of further pedal actuation would be.

It is to be understood that release of the pedal 62 by the operator allows the pedal 62 to pivot in the opposite, second pivotal direction under the resilience of the springs 86,90,100, so that the parts are returned to the position shown in FIG. 1. It will thus be seen that operation for release of the brakes is exactly the opposite as that described.

The embodiments of the invention in which an exclusive property or privilege is claimed are defined as follows:

1. In a brake control mechanism including a spool movable in the bore of a body to a first porition wherein the brake of a vehicle is released, and to a second position wherein the brake of a vehicle is applied;
   first resilient means operatively associated with the spool and body for urging the spool toward the second position;
   lever means pivotably mounted relative to the body;
   second resilient means operatively associated with the spool and lever means for urging the spool against the resilience of the first resilient means, the second resilient means urging the lever in a first pivotal direction;
   third resilient means operatively associated with the body and lever means for biasing the lever means in a second pivotal direction, the lever means being pivotable in the first pivotal direction against the bias of the third resilient means allowing the second resilient means to extend, in turn allowing the first resilient means to extend to move the spool from its first toward its second position;
   the second resilient means comprising first and second resilient springs operatively associated with the spool and lever means, such that upon initial pivoting of the lever means in the first direction against the resilience of the third resilient means, both the first and second springs urge the spool against the resilience of the first resilient means, and upon a further certain degree of pivoting of the lever means in the first direction, the first spring of the first and second springs no longer urges the spool against the resilience of the first resilient means.

2. The apparatus of claim 1 wherein the second resilient means further comprise a third spring operatively associated with the spool and lever means, for providing that upon a further certain degree of pivoting of the lever means in the first direction against the resilience of the third resilient means, the force applied to the spool by the second resilient means is less than would be applied by the second spring alone of the second resilient means.

3. The apparatus of claim 2 wherein the third resilient means comprise a primary resilient spring operatively associated with the body and lever means for initial resisting of pivoting of the lever means in said first direction at a given spring rate, and a secondary spring operatively associated with said body and lever means to combine with the primary spring upon a certain degree of pivoting of the lever means in said first direction to resist further pivoting of the lever means in said first direction at a second, higher spring rate than that provided by the primary spring, the initiation of said second, higher spring rate substantially corresponding to the degree of pivoting of the lever means in the first direction wherein the first spring of the first and second springs of the second resilient means no longer urges the spool against the resilience of the first resilient means.

4. The apparatus of claim 3 wherein the third resilient means further comprises a tertiary spring operatively associated with the body and lever means and operable to combine with the primary and secondary springs upon a further degree of pivoting of the lever means in said first direction to resist further pivoting of the lever means in said first direction at a third spring rate higher than the spring rate provided by the combined primary and secondary springs, the initiation of said third spring rate substantially corresponding to the degree of pivoting of the lever means providing that force applied to the spool by the second resilient means is less than would be applied by the second spring alone of the second resilient means.

5. The apparatus of claim 1 wherein the third resilient means comprise a primary resilient spring (86) operatively associated with the body and lever means for initial resisting of pivoting of the lever means in said first direction at a given spring rate, and a secondary spring operatively associated with said body and lever means to combine with the primary spring upon a certain degree of pivoting of the lever means in said first direction to resist further pivoting of the lever means in said first direction at a second, higher spring rate than that provided by the primary spring, the initiation of said second, higher spring rate substantially corresponding to the degree of pivoting of the lever means in the first direction wherein the first spring of the first and second springs of the second resilient means no longer urges the spool against the resilience of the first resilient means.

6. The apparatus of claim 4 wherein the secondary spring (90) is in a preloaded state as the pivotal movement of the lever means in said first direction is resisted by only the primary spring at the third spring means.

7. The apparatus of claim 6 wherein the tertiary spring is in a preloaded state as the pivotal movement of the lever means in said first direction is resisted by only the primary and secondary springs of the third spring means.

8. In a brake control mechanism including a spool movable in the bore of a body to a first position wherein the brake of a vehicle is released, and to a second position wherein the brake of a vehicle is applied;
   first resilient means operatively associated with the spool and body for urging the spool toward the second position;
   lever means pivotably mounted relative to the body;
   second resilient means operatively associated with the spool and lever means for urging the spool against the resilience of the first resilient means, the second resilient means urging the lever means in a first pivotal direction;
   third resilient means operatively associated with the body and lever means for biasing the lever means in a second pivotal direction, the lever means being pivotable in the first pivotal direction against the bias of the third resilient means allowing the second resilient means to extend, and in turn allowing the first resilient means to extend to move the spool from its first toward its second position;
   the third resilient means comprising a primary resilient spring operatively associated with the body and lever means for initially resisting pivoting of the lever means in said first direction at a given spring rate, and a secondary spring operatively associated with the lever means and body to combine with the primary spring upon a certain degree of pivoting of the lever means in said first direction to resist further pivoting of the lever means in said first direction at a second, higher spring rate than that provided by the primary spring.

9. The apparatus of claim 8 wherein the secondary spring is in a preloaded state as the pivotal movement of the lever means in said first direction is resisted by only the primary spring at the third spring means.

10. The apparatus of claim 9 wherein the third resilient means further comprises a tertiary spring operatively associated with the body and lever means and operable to combine with the primary and secondary spring upon a further degree of pivoting of the lever means in said first direction to resist further pivoting of the lever means in said first direction at a third spring rate higher than the spring rate provided by the combined primary and secondary springs.

11. The apparatus of claim 10 wherein the tertiary spring is in a preloaded state as the pivotal movement of the lever means in said first direction is resisted by only the primary and secondary springs of the third spring means.

* * * * *